June 19, 1962 N. H. KENT ET AL 3,039,178
MANUFACTURE BY EXTRUSION OF TURBINE ENGINE BLADES
Filed Jan. 9, 1958 2 Sheets-Sheet 1
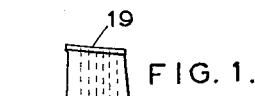
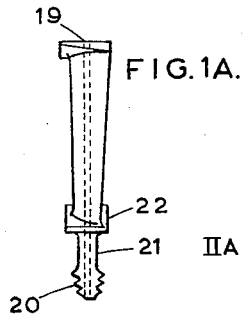
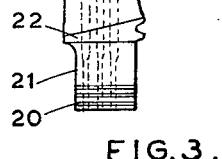
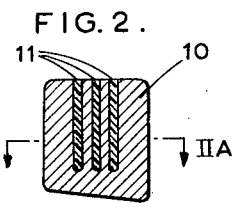
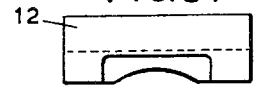
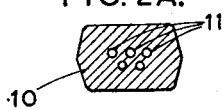
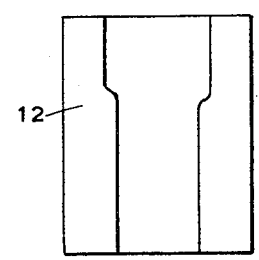
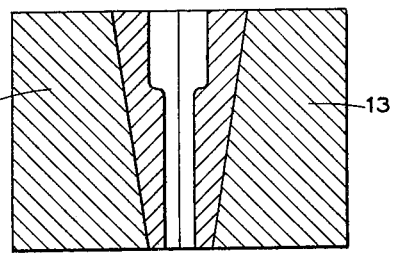
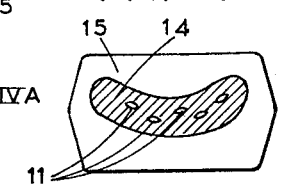
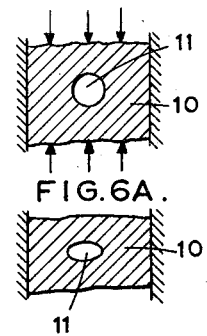
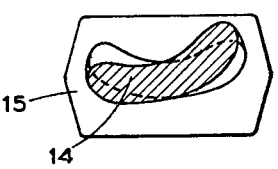
Nelson Hector Kent
George Oswald Eccles
INVENTORS
BY
Leech & Radue
ATTORNEYS

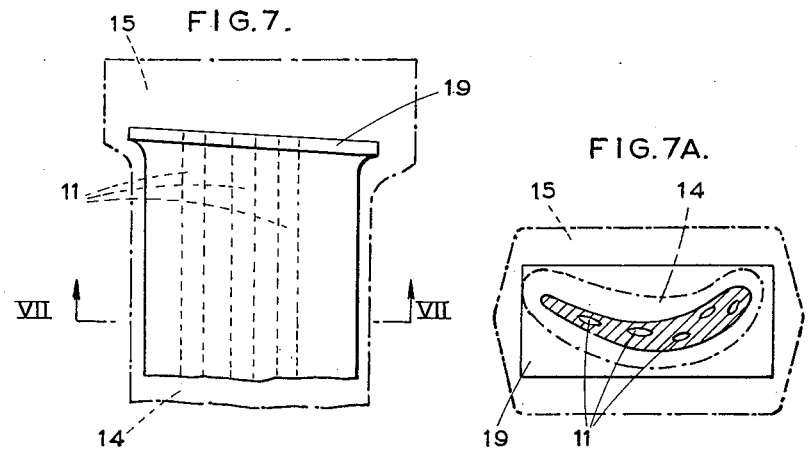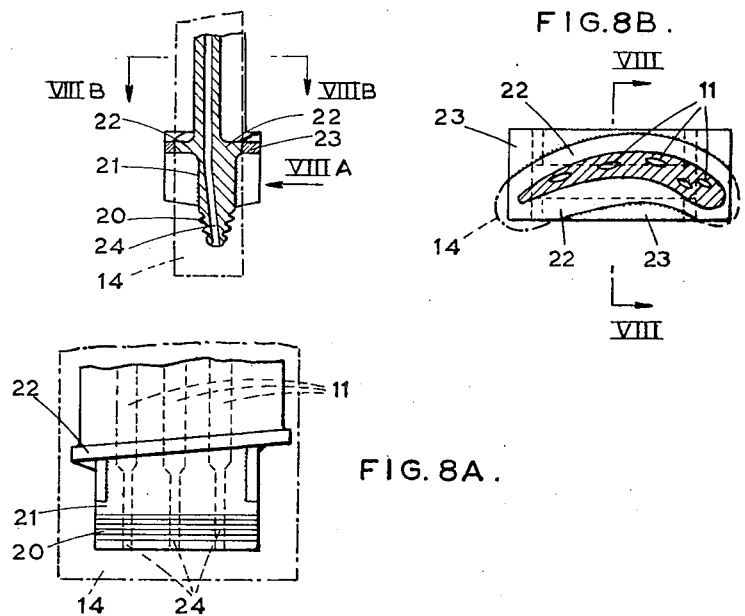

United States Patent Office 3,039,178
Patented June 19, 1962

3,039,178
MANUFACTURE BY EXTRUSION OF TURBINE
ENGINE BLADES
Nelson Hector Kent, Derby, and George Oswald Eccles,
Barrowford, England, assignors to Rolls-Royce Limited, Derby, England, a British company
Filed Jan. 9, 1958, Ser. No. 708,045
Claims priority, application Great Britain Jan. 11, 1957
6 Claims. (Cl. 29—156.8)

This invention relates to the manufacture of blades and particularly turbine blades for internal combustion turbine engines from metals which are resistant to high temperatures such as nickel-chrome alloys.

The invention provides a method of manufacturing blades of the type which have a root-fixing portion, a blade profile portion, a root platform adjacent the root-fixing portion, a tip shroud and cooling passages running lengthwise of the blade which passages have open ends at the blade root and at the blade tip.

According to this invention a method of forming a blade of the said type includes the following steps:

(a) Producing a billet,
(b) Drilling a plurality of holes axially of the billet,
(c) Inserting filler material into the drilled holes,
(d) Partially extruding the billet in a die with lubrication by pressure exerted substantially along one diameter only of each of said drilled holes thereby to produce a blade section of approximate aerodynamic form leaving an integral portion of the billet remaining to form the tip shroud or platform, said holes thereby being deformed in the profile portion to be of elongated or lenticular cross-section,
(e) Machining the blade profile portion and root-fixing portion to final shape and machining the tip shroud or platform from the non-extruded portion of the billet,
(f) Removing filler at a stage in the manufacturing process subsequent to extrusion.

In using the term "axially" we include holes which will eventually run through the blade spanwise and which may be inclined to the true axis of the blade and therefore initially of the billet. Thus for example in certain blade designs it may be desirable for the holes at the leading and trailing edges to be slightly so inclined to accommodate the narrowing of the blade toward the tip. If the blade is a twisted blade the twisting may be carried out after the extrusion of the blade portion or in the process of such extrusion as by using a die in which the twist is inherent.

Platform portions may be welded to the root-fixing portions of the blade. The extrusion process may leave portions projecting from the root-fixing portions to which more metal is welded to complete the platforms.

Our co-pending United States application No. 689,-440 filed October 10, 1957, describes the manufacture of turbine blades by a somewhat similar process in which a tip shroud may be welded to the profile portion after machining of the latter, the non-extruded portion of the billet forming the root-fixing and root platform portions. In certain blade designs it may be advantageous to adopt the present invention in which the non-extruded portion provides material to form an integral tip shroud or platform, whilst the root shroud or platform may be formed in part at least by welding material to the extruded portion.

The billet may be initially of substantially rectangular cross-section, in which case deformation during the extrusion will take place substantially wholly between the two opposite faces of the rectangular section.

Preferably the holes are blind holes which may extend from the end of the billet which is not extruded, so far that after extrusion the holes will terminate adjacent the portion of the extruded portion which is machined to form the root-fixing portion of the blade. Suitable holes may then be drilled in the root-fixing portion to connect with these holes. At the other end the holes will lead out through the tip shroud or platform.

In certain cases the tip shroud may be inclined with respect to the axis of the blade, and in such cases the extrusion die may have a correspondingly inclined part and the billet to be deformed by the extrusion with a complementarily inclined surface.

In methods of manufacture of turbine blades according to the present invention the thickness of the extruded section will be sufficient to provide the root-fixing portion which may comprise fixing features such as the well-known fir-tree. An extrusion of such thickness will provide sufficient material for rudimentary root platforms to be machined, these being added to by the welding of additional platform pieces.

Preferably a split die is used for the extrusion which will facilitate the extrusion by pressure in a single sense. Filler material used in the manufacture of blades according to the present invention may be of low carbon steel and the method of removal of such filler material may comprise utilising dilute nitric acid to which a wetting agent has been added. A particularly suitable lubrication for the billet during extrusion may be obtained by nickel-plating the billet and applying a colloidal graphite to the extrusion die surface, as described in co-pending United States application No. 702,519, now Patent No. 2,947,076. An example of this invention will be described by reference to the accompanying drawings.

FIGURE 1 is an elevation of a blade which may be manufactured by the process of the present invention.

FIGURE 1A is a view of the same blade in the direction at right angles to that of FIGURE 1.

FIGURE 2 is a vertical section through the billet from which the blade is to be extruded after the blind holes have been drilled.

FIGURE 2A is a section on the line 11A—11A of FIGURE 2.

FIGURE 3 is an end view of one-half of the extrusion die.

FIGURE 3A shows the same one-half of the die in plan.

FIGURE 3B is a section through the two halves of the die on a plane at right angles to the two die faces.

FIGURE 4 is an elevation of the billet after extrusion.

FIGURE 4A is a section on the line IVA—IVA of FIGURE 4.

FIGURE 5 is a section on the line V—V of FIGURE 4 after the blade profile portion has been twisted.

FIGURES 6 and 6A are diagrams showing the effect on the drilled holes of the method of extrusion according to this invention.

FIGURES 7 and 7A illustrate the effect of the machining of the tip shroud or platform from the non-extruded portion of the billet.

FIGURES 8 and 8A illustrate the effect of the machining of the root-fixing portion and rudimentary root platform portions from the extruded portion of the billet, and FIGURE 8B illustrates a section on the blade profile portion looking towards the root platform and showing the extension of the root platform by parts welded to the rudimentary platform parts.

The billet 10 is formed from a cut bar by forging. Blind holes 11 are then drilled in it. Rods of low carbon steel, e.g. of mild steel having a carbon content of less than 0.25% are inserted in the holes and are located by welding at the ends of the holes. The billet is then nickel-plated to provide lubrication during extrusion and then heated and extruded in a split die, the two halves of which are shown at 12 and 13. In order to improve the lubrication during extrusion it has been found desirable to apply graphite to the surfaces of the extrusion die. During extrusion the reduction of cross-sectional area takes place substantially wholly at right angles to the plane of the die split.

On removal from the die the billet has the shape shown in FIGURES 4 and 4A. The effect of the extrusion is to deform round holes 11 into the shape shown in FIGURE 6A as a result of the extrusion pressure exerted in the direction of the arrows shown in FIGURE 6.

The billet on removal from the die has a blade portion 14 and a non-extruded portion 15 from which an integral tip shroud will be machined.

The next step is to twist the blade portion 14 whereby a section as at V—V of FIGURE 4 occupies the position shown in FIGURE 5 relative to the non-extruded portion of the billet 15.

The extruded blade blank is then machine to provide: (a) the profile portion of the blade, (b) a root-fixing portion with rudimentary platforms, and (c) an integral tip shroud.

The effect of the machining of the profile portion of the blade can be carried out by means of a suitable cam profiling machine in known manner. The machining of the integral tip shroud is illustrated in FIGURES 7 and 7A where the chain dotted lines illustrate the outline of the extruded blade blank and the tip platform is shown in full lines at 19. FIGURE 7A also illustrates the section of the blade profile portion on the line VIIA—VIIA of FIGURE 7. It will be noted that the tip shroud is substantially rectangular in form.

Referring to FIGURES 8 and 8A it will be observed that the root-fixing portion of the blade comprises fir-tree fixing 20, a stem portion 21 and rudimentary platform portions 22. These parts are provided by the material at the tip of the extruded section shown in FIGURE 4. In these figures and in FIGURE 8B the extent of the extruded section is shown in chain dotted lines. In FIGURE 8B extensions 23 are shown welded to the rudimentary platform portions 22 to produce root platforms of substantially rectangular form. Such extensions will normally be welded to the blade material to be of extent greater than the final shape of the platform and thereafter machined in the final machining operation of the root portion of the blade. Holes 24 are drilled through the fir-tree root 20 and stem portion 21 to connect with the flattened holes 11 in the blade profile portion.

The filler material may be removed from the holes 11 at any time after extrusion and dilute nitric acid with a wetting agent added may be used for this purpose.

What we claim is:
1. The method of forming a blade of an internal combusion turbine engine from a metal which is resistant to high temperature which includes the following steps:
   (a) producing a billet of substantially rectangular cross section,
   (b) then drilling a plurality of holes each substantially axially of and incompletely through the billet leaving an undrilled end,
   (c) inserting a filler material into all of the drilled holes,
   (d) partially extruding the billet undrilled end first axially in a single operation in a lubricated die which exerts squeezing pressure substantially along parallel diameters only of said drilled holes which diameters extend normal to the long faces of the billet cross-section thereby to produce an undrilled root-fixing portion and a blade section of approximate aerodynamic form leaving a non-extruded integral portion of the billet remaining to form the tip shroud, said holes thereby being deformed in the profile portion to be of lenticular cross-section,
   (e) machining the blade profile and the undrilled root-fixing portion to final shape and machining the tip shroud from the non-extruded portion of the billet,
   (f) and simultaneously removing all of the filler at a stage in the manufacturing process subsequent to extrusion, and
   (g) drilling holes through the machined root-fixing portion from its remote end to connect with the original holes.

2. The method claimed in claim 1 in which the extrusion process provides metal for only rudimentary platform portions which are machined projecting laterally from the junction of blade and root-fixing portions to which metal is welded to complete the platform.

3. The method claimed in claim 1 in which the blade is twisted by the die during the extrusion of the blade portion.

4. The method claimed in claim 1 in which the blade is twisted after the extrusion of the blade portion.

5. The method claimed in claim 1 in which the holes extend from the end of the billet which is not extruded so far that after extrusion they will terminate adjacent to that part of the extruded portion which is machined to form the root fixing portion of the blade and holes are drilled substantially axially in the root-fixing portion to connect with the original holes.

6. The method claimed in claim 1 in which the extrusion die has an inclined part causing the non-extruded part of the billet to have a surface inclined to a normal to the billet axis from which an inclined tip shroud is machined.

References Cited in the file of this patent

UNITED STATES PATENTS

| | | |
|---|---|---|
| 2,013,622 | Bedford et al. | Sept. 3, 1935 |
| 2,047,555 | Gardner | July 14, 1936 |
| 2,389,876 | Sequin | Nov. 7, 1945 |
| 2,654,277 | Hedlund | Oct. 6, 1953 |
| 2,751,988 | Lemont et al. | June 26, 1956 |
| 2,767,460 | Schultz | Oct. 23, 1956 |
| 2,799,918 | Goldthwaite et al. | July 23, 1957 |
| 2,830,357 | Tunstall et al. | Apr. 15, 1958 |
| 2,836,884 | Graham | June 3, 1958 |
| 2,891,307 | Betteridge | June 23, 1959 |

FOREIGN PATENTS

| | | |
|---|---|---|
| 745,655 | Great Britain | Feb. 29, 1956 |
| 755,610 | Great Britain | Aug. 22, 1956 |